United States Patent [19]
Market

[11] Patent Number: 5,612,509
[45] Date of Patent: Mar. 18, 1997

[54] STACKABLE WIRE STAPLE AND RACEWAY SYSTEM

[76] Inventor: Roger Market, 3108 Riverview Dr., Eau Claire, Wis. 54703

[21] Appl. No.: 235,803

[22] Filed: Apr. 29, 1994

[51] Int. Cl.⁶ .................................................. H01H 9/02
[52] U.S. Cl. .......................................... 174/53; 248/68.1
[58] Field of Search ............................. 174/53; 248/68.1, 248/71, 73, 74.1

[56] References Cited

U.S. PATENT DOCUMENTS

| | | | |
|---|---|---|---|
| 4,202,457 | 5/1980 | Tansi | 220/3.3 |
| 4,395,009 | 7/1983 | Bormke | 248/68 CB |
| 4,817,910 | 4/1989 | Molnar et al. | 248/68.1 |
| 5,201,484 | 4/1993 | Thoen | 248/68.1 |
| 5,354,953 | 10/1994 | Nattel et al. | 174/54 |

Primary Examiner—Kristine L. Kincaid
Assistant Examiner—Dean A. Reichard
Attorney, Agent, or Firm—D. L. Tschida

[57] ABSTRACT

A modular fastener system for securing conductive cabling to a variety of surfaces and wiring devices. In a strap configuration, a base support includes a pair of standoffs and a connecting bridge piece that define a conductor support channel. The base standoffs include wall fasteners and a plurality of bores having serrated surfaces. A plurality of ribbed protrusions project from exposed surfaces of each base and retainer bridge. A retainer strap includes a pair of standoffs having serrated bores and a connecting bridge. A plurality of serrated prongs extend from the retainer standoffs and align to provided bores at the base and other retainer straps to define further conductor support channels, upon vertically stacking a number of retainer straps to the base and/or each other. In various wiring devices, the base may include a spanner bracket, a fixed or gangeable junction box or a bushing collar. An alternative strap fastener includes a bridge piece shaped to contain pipes and serrated flanges which mate to any of the base supports.

18 Claims, 12 Drawing Sheets

STACKABLE WIRE STAPLE AND RACEWAY SYSTEM

BACKGROUND OF THE INVENTION

The present invention relates to cable and raceway fasteners and, in particular, to a modular, stackable fastener system including retainer straps having serrated prongs that interlock with serrated bores at varieties of base supports, such as nailed base straps, spanner brackets, junction boxes and support bushings.

With increasing labor costs and regulatory requirements for residential and commercial electrical wiring, a need exists for a raceway support system to securely retain and align individual conductors and related multi-conductor conduits to one another. Varieties of disparate, noncompatible fasteners exist, but which are constructed to meet a relatively few, special applications.

Preferably a fastener system should be compatible to a variety of applications, mounting surfaces and conventional wiring devices to permit retrofit use, as well as use within new installations. The system should also be compatible with current installation practices to facilitate acceptance by regulatory authorities, equipment buyers and installers.

Some of the most frequently encountered fasteners used by electricians to secure individual conductors are wire staples. Such staples include nail or screw fasteners which mount through a strap member to a support surface to contain a single conductor bound beneath the strap. The staples are commonly secured to wood and metal frame members and varieties of wall surfaces. Multiple conductors can be contained beneath a single strap, but the straps do not permit a stacked mounting to each other.

Bushings and clamp fasteners also exist for retaining conductors to junction boxes and cabinets at provided "knock-outs". Depending upon the device, screw fastened clamp plates, ribbed wedges and ribbed strap pieces can be used to retain individual conductors to the bored openings. Examples of such devices can be found at U.S. Pat. Nos. 4,892,979; and 3,493,205.

Varieties of conductor retainers have also been integrated into various wiring devices and junction boxes. Depending upon the junction box construction, the retainers may comprise screwed clamps or integral, resilient retainers that cooperate with the box and conductor opening to grip the conductor. Some junction boxes merely provide an opening and rely on an adjacent, separately attached strap fastener (e.g. a wire staple) to secure the conductor to a framing member.

A particular shortcoming of most conventional fasteners is that the fasteners support a single conductor and require horizontal wall space, which space can become limited as the numbers of conductors required in most residential and commercial buildings increase. Unless tightly packed, a potential exists of abrading or piercing such conductors, once covered over during the construction process. Hazards of electrical shocks and fire especially exist for the conductors closest to the edges of a frame member.

In response to the above hazards, cognizant regulatory authorities for wiring devices and practices, such as the National Fire Protection Association have recently revised the National Electric Code to establish code requirements that define specific conductor spacings and positionings with respect to structural framing members. Such regulations inherently limit the available lateral spacings at available framing members. The numbers of potential conductors that can be secured to a framing member are thereby limited, unless redundant intermediate termination points are added.

The present invention was developed in appreciation of the foregoing needs and limitations of existing fasteners and wiring devices used in commercial and residential electrical construction. The fasteners were developed to provide a modular system compatible with existing installation techniques, manufacturing technology and wiring devices and to provide a system of components which can be readily implemented into existing manufacturing processes and use by the installer without undue learning.

SUMMARY OF THE INVENTION

It is accordingly a primary object of the present invention to provide a two-piece strap fastener for electrical conductors having a base strap and an interlocking retainer strap and which accommodates a vertically stacked conductor arrangement.

It is a further object of the invention to provide fastener components that may be attached to a variety of wall or framing members and which are adaptable to a range of wiring appliances found in electrical distribution systems, for example, brackets which span multiple framing members, junction boxes, termination cabinets and conduit runs.

It is a further object of the invention to provide a fastener having a shape which indexes a conductor to the fastener and which shape accommodates stack mounting of multiple fasteners and conductors to one another.

It is a further object of the invention to provide fasteners including interlocking portions which permit release of any one of a stack of fasteners without undue effort, such as during retrofit applications, yet provide a secure retention to each other.

It is a further object of the invention to provide a fasteners which can be molded from electrically insulated plastics in large volumes and be compatible with non-metallic conductors.

It is a further object of the invention to provide a variety of devices compatible with the strap retainers.

It is a further object to provide a multi-section, gangeable junction box.

Various of the foregoing objects, advantages and distinctions of the invention are achieved in a wall or framing member mounted staple construction and various alternative constructions. In a staple version, a base provides a strap having a pair of nail or screw fasteners. A channel defined by a pair of vertical standoffs and a connecting bridge piece supports a first conductor to a primary support surface. A number of serrated bores are formed into the standoffs. The bridge piece is recessed and includes ribbed protrusions to receive and retain a second conductor.

A retainer strap of comparable construction to the base strap includes a number of ribbed or serrated fasteners. The fasteners extend from a second pair of bored standoffs that are connected by a recessed bridge piece. The fasteners align and interlock to the bores of the base standoffs to secure the second conductor between bridges of the base and retainer. The serrated bores and recesses at the retainer bridge align and contain yet another conductor immediately over the first and second conductors.

In other constructions, various devices commonly found in conventional distribution systems include flanged surfaces containing numbers of serrated bores which mate with the retainer strap. Retainer straps of differing widths can retain one or more conductors to each device.

In one construction, a spanner bracket is constructed to span and fasten to adjacent framing members. Interlocked, telescoping sections of the bracket each include a number of serrated bores, which mate to the prongs of the conductor retainer straps and conduit retainers. Junction boxes containing serrated prongs and/or a cooperating slide channel may also be secured to the bracket arms.

In another strap construction, the spanner bracket or multiple strap bases can independently cooperate with straps having bridge pieces shaped to support pipe and conduits. Flanged strap ends include ribbed projections which mate to the serrated bores of the bracket and strap bases.

In various junction box constructions, the boxes are configured to receive conventional duplex receptacles and/or switches. The boxes are constructed to permit fixed wall and multi-gang mountings. Serrated prongs and slide channels permit mountings to the telescoping bracket. Detachable wall sections interlock to open-sided box pieces to define boxes of various widths. Separate bored flanges receive one or more retainer straps to secure conductors which enter provided knockouts.

Bulkhead bushings modified to include the invention are also provided which mount to knock-out apertures. A number of radially disposed flexible, flanged fingers of each bushing mate with and retain a bushing to a terminal cabinet. Separate flanged surfaces include a number of serrated bores that receive a mating strap retainer. Multiple, stacked conductors can thus be separately retained to the bushing.

Still other objects, advantages and distinctions of the invention are described below with respect to the appended drawings. To the extent various modifications and improvements have been considered, they are described as appropriate. The description should not be literally construed in limitation of the invention which rather should be interpreted within the scope of the further appended claims.

DESCRIPTION OF THE PREFERRED EMBODIMENT

Figure 1:
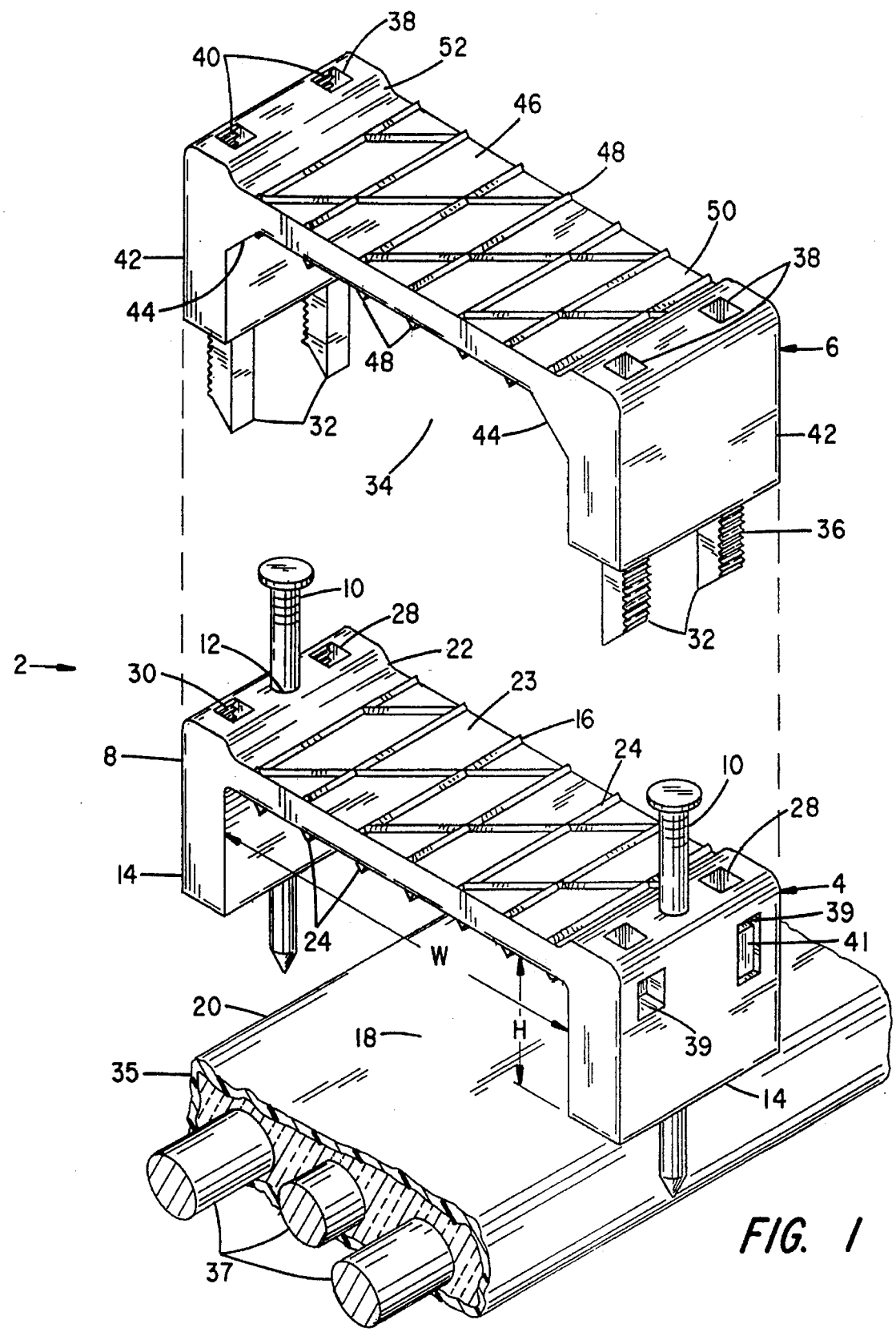
FIG. 1 is a perspective drawing shown in exploded assembly of a stapled strap base and retainer strap.

Referring to FIG. 1 a perspective drawing is shown in exploded assembly of a stackable, conductor fastener 2 of the invention. The fastener 2 includes a base strap 4 and one of a potential number of stacked retainer straps 6. The base 4 supports a pair of nails 10 at through bores 12. The bores 12 are slightly undersized from the nail diameter to securely retain the nails 10 to the base strap 4, once mounted. In lieu of nails 10, screw fasteners or other known fasteners might be substituted which are compatible with a particular surface to which the base strap 4 is to be mounted.

The strap 4 is shaped to include a pair of vertical standoffs 14 which are integrally joined to a bridge piece 16. A recessed channel 18 is formed beneath the bridge 16 having a width "W" and height "H". The channel 18 is normally sized to accommodate an insulated conductor 20 that is secured by the base 4.

A depression or recess 22 is formed in an upper surface 23 of the bridge 16. A number of raised, diagonal protrusions 24, which criss-cross each other, extend into the channel 18 and recess 22 and provide a gripping surface for the conductor 20 and a second conductor (not shown) that is aligned to the recess 22.

A number of square or rectangular bores 28 extend into the standoffs 14 to either side of each of the nails 10. Each bore 28 includes a series of ribbed or serrated protrusions 30. The protrusions 30 of each bore 28 mate with a number of prongs 32 having a complementary shape to the bores 30. The prongs 32 are integrally molded with the retainer strap 6. Although rectangular prongs 32 are shown, a variety of other shapes can be used to equal advantage.

The relative insertion depth of the prongs 32 into the bores 28 is determined by the thickness of the conductor 20 being bound. A channel 34 of the retainer strap 6 is sized in relation to the thickness of the typically anticipated conductor 20, the depth of the recess 22 and the height of the standoffs 42. Preferably, the prongs 32 do not bottom out in the bores 28 before compressing against the insulated conductor cover 35. Surface serrations 36 of each prong 32 interlock with the serrated bores 28 to secure the retainer strap 6 to the base strap 4.

Each retainer strap 6 also includes a number of bores 38 having serrated bore surfaces 40. The bores 38 are aligned to receive the prongs 32 of other vertically aligned retainer straps 6. The depth of the bores 28 and 38 are sized in relation to the prongs 32 to assure a secure retention of each conductor 20. Multiple conductors 20 can thus be stacked, one upon the other, at stacked base and retainer straps 4, 6 to accommodate code requirements. Depending upon the numbers of conductors and existing mountings to a framing member, existing staples can be replaced with the fasteners 4, 6 which also free up additional space to accommodate additional conductors.

The retainer strap 6 can be constructed as a permanently mounted strap or the base and retainer straps 4, 6 can be configured to permit a selected release of all or pairs of the prongs 32. Such a release feature facilitates the re-routing of conductors, such as might occur during remodeling efforts where conductor organization, conductor numbers or ampacities are being varied.

One mechanism to achieve a releasable interconnection between the bores 28 and 38 and prongs 32 is to provide a flexible latch 41 at a side window 39 to the bores 28 and 38 in lieu of or in combination with the serrated surfaces 30 and 40. A number of latches 41 can be formed in conjunction with the bores 28, 38 of each base or retainer strap 4, 6, although only one is shown.

Upon inserting a prong 32, the serrations 36 interlock with the latch piece 41 to secure the prong 32. The prong is released by inducing the latch 41 to pivot away from the serrations 36, such as by inserting a probe into each window 39. In normal practice, two prongs 32 would be released simultaneously, with the opposite vertical standoffs 42 of each strap 6 being sequentially released. In lieu of releasing all four prongs 32, most typically it is necessary to only release two of the prongs 32 and bend a retainer strap bridge piece 46 to effect release of a conductor 20.

In lieu of forming an active, flexible latch plate 41 into each strap 4 or 6, the bores 28 and 38 can be sized to permit a degree of flexion of the prongs 32 inward. In this instance, windows 39 can be provided which open to the bores 28 and 38. Upon inserting appropriately shaped tips of a pliers or other multi-prong release tool into each window 39 and simultaneously disengaging the surfaces 36, 30 of both prongs 32 from each other, the retainer strap 6 is released from the base strap 4. Repeating the process for the other pair of prongs 32 accommodates a complete release of the retainer strap 6. Windows 39 or latches 41 can be formed into any of the devices described below or straps 6.

The above construction may require that the surfaces 36 normally exhibit an outwardly directed resilient bias toward the serrated surfaces 30 and 40 to assure an interlocked fit between each strap pair 4, 6 or 6, 6. Such a bias can be obtained with an appropriate selection of the strap materials. Varieties of conventional electrically insulative polyethylene and plastic materials, which are usable to fabricate the straps 4 and 6, exhibit such a property. Such materials are also commonly employed in injection molded processes. Alternatively, a pair of inclined surfaces or tabs 44 can be formed into the corners of the bridge 46 of each retainer strap 6. The angle of inclination of the surfaces of tabs 44 can be adjusted to assure that as the prongs 32 are admitted to the bores 28 and 38, and the surfaces on tabs 44 contact and restrain the conductor cover 35, the standoffs 42 and prongs 32 are deflected outward. The surfaces 44 can be constructed as detachable tabs or be permanently molded to the strap.

Like the bridge 16, the bridge 46 includes a plurality of ridged protrusions 48 at the channel 34 and an exposed surface 50. The protrusions 48 indent into the insulative covering 35 of the conductors 20 to interlock the conductor 20 to the strap pairs 4, 6 or 6, 6 and thereby prevent lateral movement. The bridge 46 is vertically recessed at a depression 52 in relation to the standoffs 42. Like the recess 22, the recess 52 minimizes lateral shifting of the conductors within the bound strap pair 4, 6 or 6, 6.

In normal practice, the straps 4, 6 find widest usage with ROMEX or non-metallic types of multi-conductor cables. Such cables typically accommodate from two to four 15, 20 or 30 amp conductors 37, which conductors are found in the largest percentage of commercial and residential construction. While the width and height of any given conductor may vary between manufacturers, the variations in dimensions can be accommodated by sizing the channels 18, 34 and recesses 22, 52 to mate with nominal industry standards for such conductors.

Strap dimensions may also be sized to accommodate multiple sizes of conductors versus only one size. Preferably the two closely sized conductors 20 can be used with each strap 4, 6. The protrusions 24, 48 particularly permit this capability at the protrusions 24, 48. That is, any lateral movement of any smaller conductor bound by the straps 4, 6 is prevented with the gripping of the protrusions 24, 48 to the cover 35. The inclined tabs 44 further facilitate the use of straps 4, 6 with differing size conductors, since the tabs 44 can be removed as necessary to accommodate larger wire sizes at the channels 18, 34.

Appreciating the broad utility of the concepts embodied in the straps 4, 6, it is to be understood that the base strap 4 can be adapted into a variety of components or wiring devices found in conventional electrical distribution systems. Exemplary devices are adjustable spanner or support brackets, junctions boxes, bulkhead bushings and conduit fasteners. FIGS. 2 through 12 depict various of these devices which have been modified to include the foregoing improvements and others. Together, a modularly configured collection of components are presented and with which a distribution system is achieved that is compatible with conventional framing and electrical installation techniques. Such devices also do not appreciably add to manufacturing costs. Moreover, they reduce the time necessary for an installer to effect initial installation and/or remodeling.

Figure 2:
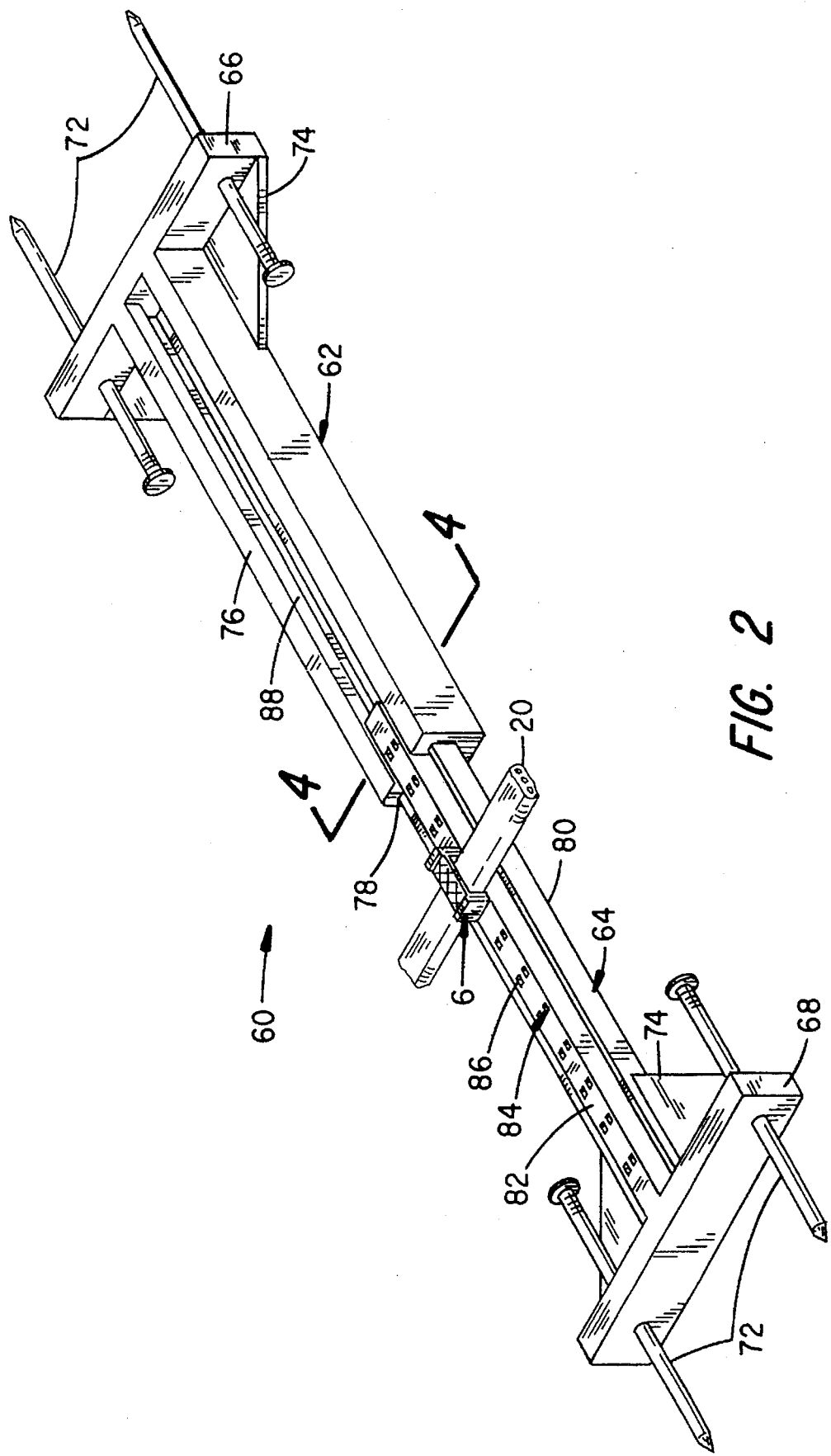
FIG. 2 is a perspective drawing showing the top surface of a telescoping support bracket.
Figure 3:
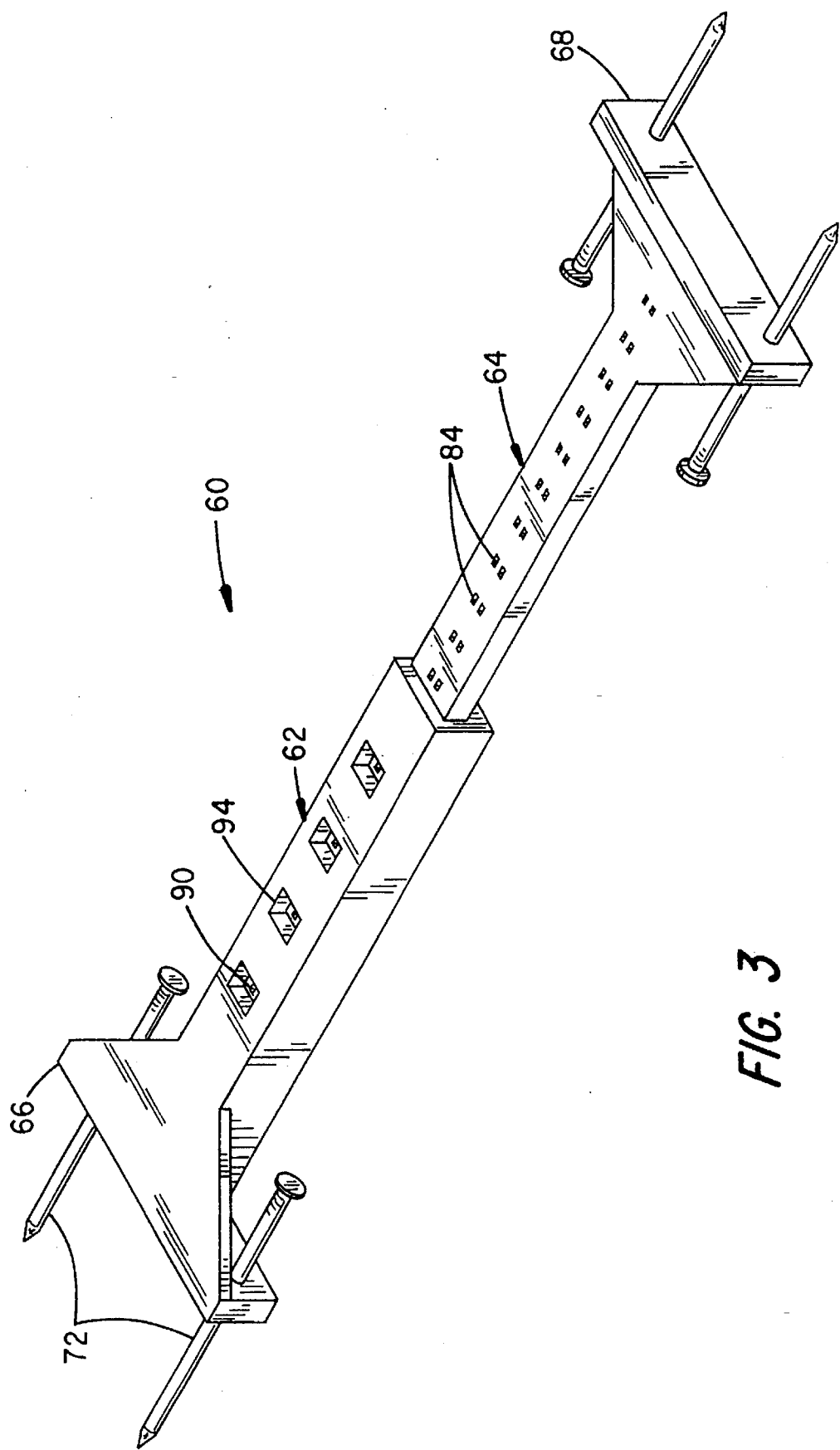
FIG. 3 is a perspective drawing showing the bottom surface of the bracket of FIG. 2.
Figure 4:
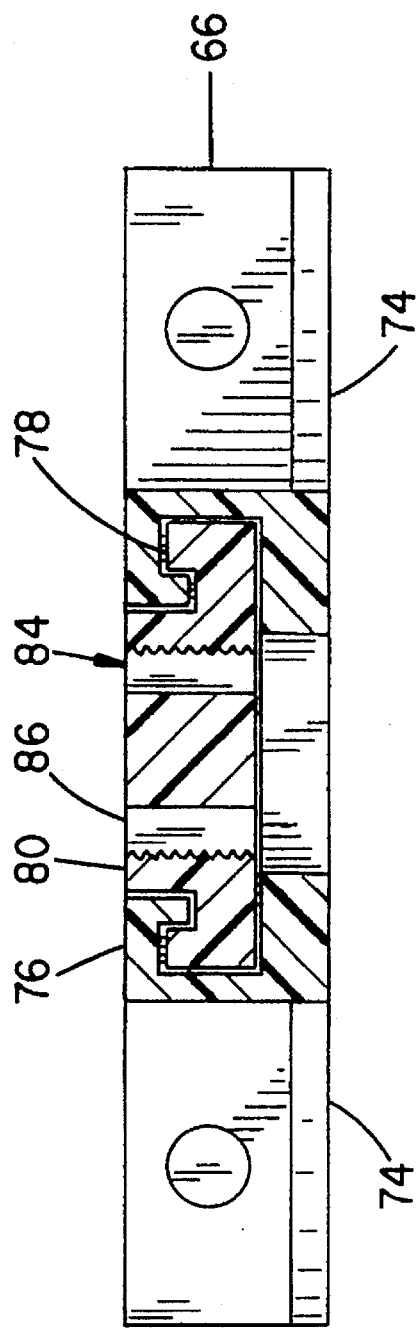
FIG. 4 ms a cross section view taken along section lines 4—4 of FIG. 2.

Turning attention to FIGS. 2 through 4, a telescoping support bracket 60 is depicted. The bracket 60 finds particular application to span cavity spaces between wood framing members, such as floor joists or wall studs. The use of the bracket 60 causes the cavity space between the framing members to become a raceway to a number of conductors 20 secured to a number of brackets 60 positioned along each cavity. In normal application, the brackets 60 are spaced approximately 2 to 3 feet apart along a cavity.

Each bracket 60 is comprised of a pair of sections 62, 64 which slide mount or telescope from one another. The sections 62, 64 respectively include a flanged end 66, 68 which support a pair of nail or screw fasteners 72. Gussets 74 integrally project from the brackets 62, 64 to stabilize the flanged ends 66, 68.

The body 76 of the bracket section 62 is shaped to provide a slide channel 78. The body 80 of the bracket section 64 exhibits a complementary shape such that the sections 62, 64 telescope from one another as depicted. The detailing of the specific shapes of the channel 78 and bodies 76, 80 are shown at FIG. 4, which depicts a cross section view taken along sections lines 4—4 of FIG. 2.

The upper surface 82 of the body 80 includes a number of paired sets 84 of apertures 86. Each aperture 86 of each pair set 84 is positioned to receive one of the prongs 32 of a retainer strap 6 and projects the full thickness of the bracket body 76. The lateral spacing between sets 84 can be adjusted, depending upon the width of the channel 34 at any given strap 6. Multiple pair sets 84 can also be staggered along the body 80 to accommodate conductors and strap widths of differing sizes. The depicted spacing presumes a constant width at each channel 34. Thus, a number of conductors 20 can be transversely positioned to each bracket 60 and retained upon mounting the prongs 32 of a strap 6 to appropriate pair sets 84.

Also provided on the bottom surfaces 90 of the sections 62, reference FIG. 3, are a number of windows 90 which are alignable with ones of the paired sets 84 of apertures 86. The windows 94 are arranged to receive the straps 6 or alternatively a junction box or fixture box 98, such as shown at FIG. 5.

Figure 5:
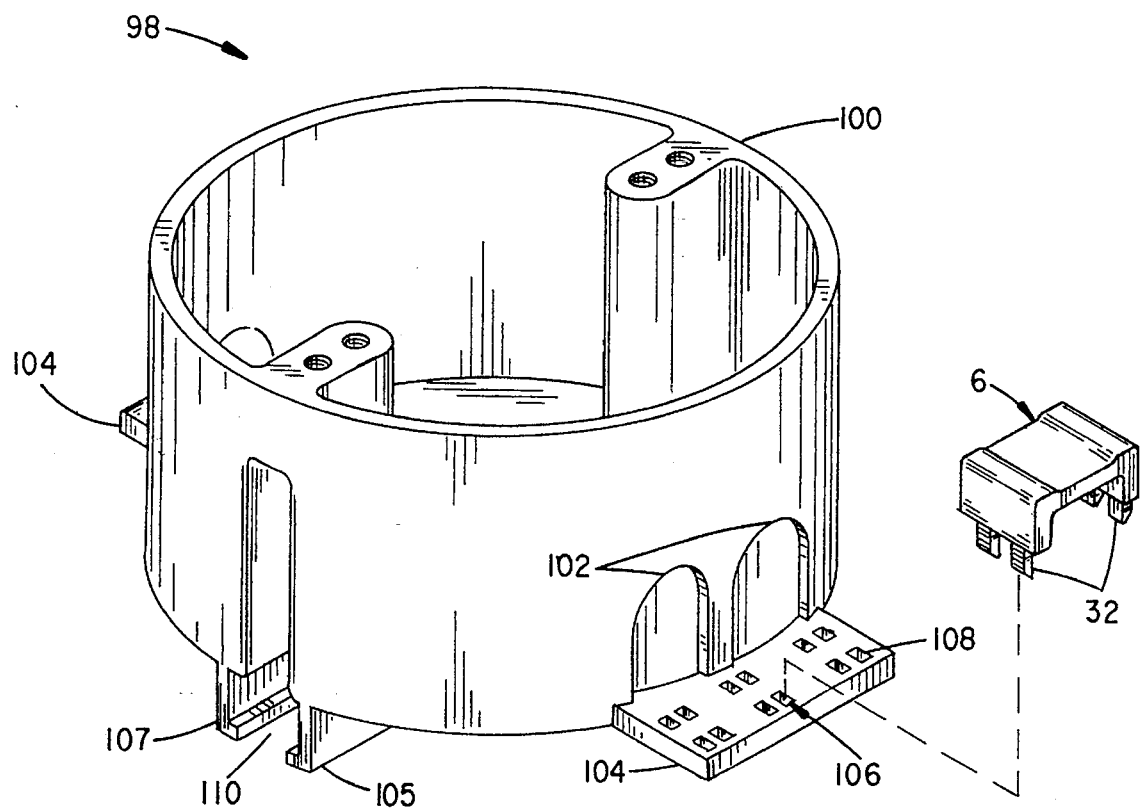
FIG. 5 is a perspective drawing of a round junction or fixture box compatible with the retainer strap fastener and support bracket.

With attention to FIG. 5, an open-ended circular junction box 98 is shown of substantially conventional construction.

A body 100 of the box 98 can be constructed to a variety of common dimensions and shapes from a variety of electrically insulative materials. Projecting from the body 100 at regions adjacent conductor knockouts 102 are flanges 104. The flanges 104 include numbers of apertures 106 having serrated bore surfaces 108 which receive the prongs 32 of the strap 6. A number of conductors 20 can thus be singularly mounted at each knockout 102. Stacked arrangements of conductors 20 may also be retained to each of the knockouts 102. The apertures 106 are arranged to provide two sets of apertures 106 at each flange 104 to mate with the prongs 32 of staples 6 of differing width at the channel 34. The apertures 106 are also arranged to accommodate the use of two straps 6 at each flange 104, before additional straps are stacked into the lower straps. Suitable conductor retention is thereby obtained.

Projecting from the bottom of the housing 100 are offset, railed flanges 105, 107 which define a channel 110. The channel 110 exhibits a complementary shape to the bracket sections 62, 64.

Figure 6:
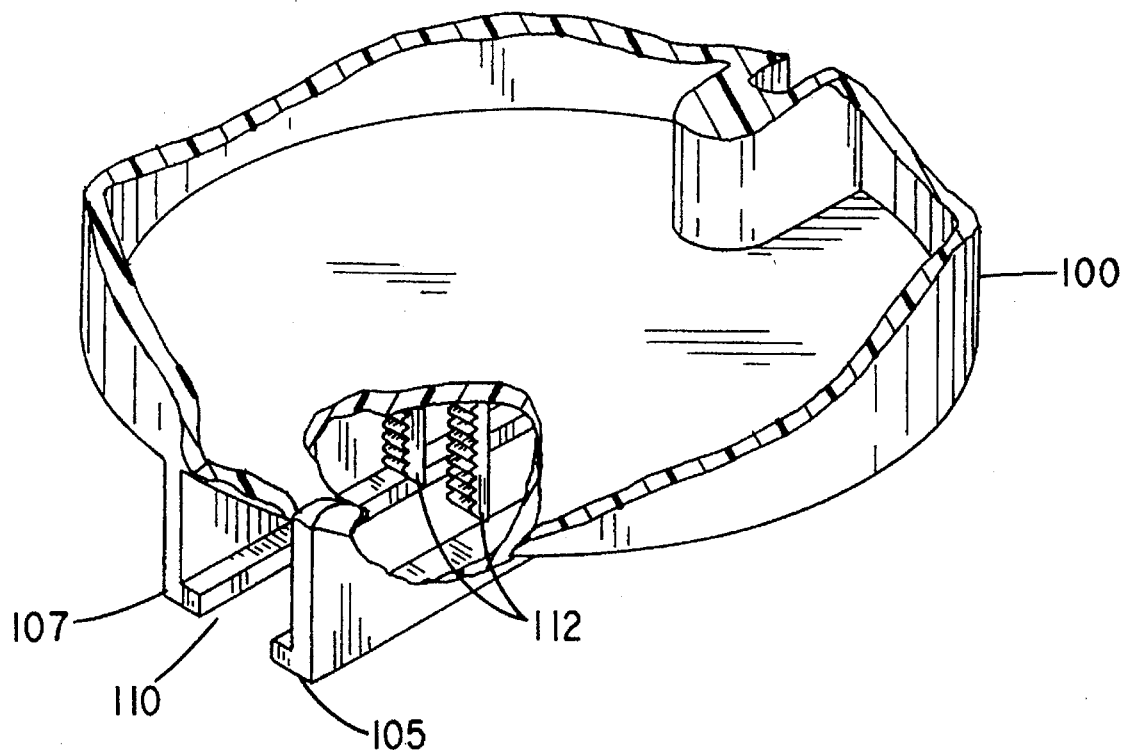
FIG. 6 is a perspective drawing of a partial section view through the channel support of the junction box of FIG. 5.

Projecting from the bottom of the housing 100 between the flanges 105, 107 are a pair of serrated prongs 112, reference FIG. 6, which mate to the apertures 96. Depending upon the material used to mold the flanges 105, 107, the flanges may be flexible or rigid. If a flexible material is used, the flanges 105, 107 can be flexed to facilitate attachment to a previously installed bracket 60. If a rigid material is used, a closed channel 116 may be used (e.g. reference FIG. 7), but which requires disassembly of an installed bracket 60.

With the mounting of the box 98 to the bracket 60, the box 98 can be laterally displaced along the bracket 60. Once properly located, the prongs 112 are inserted into an aligned aperture set 84 to retain the box 98 to the bracket 60. Upon stringing appropriate conductors 20 to the box 98, the conductors 20 are retained to either the flanges 104 and/or to the bracket sections 62, 64 with appropriate retainer straps 6.

Figure 7:
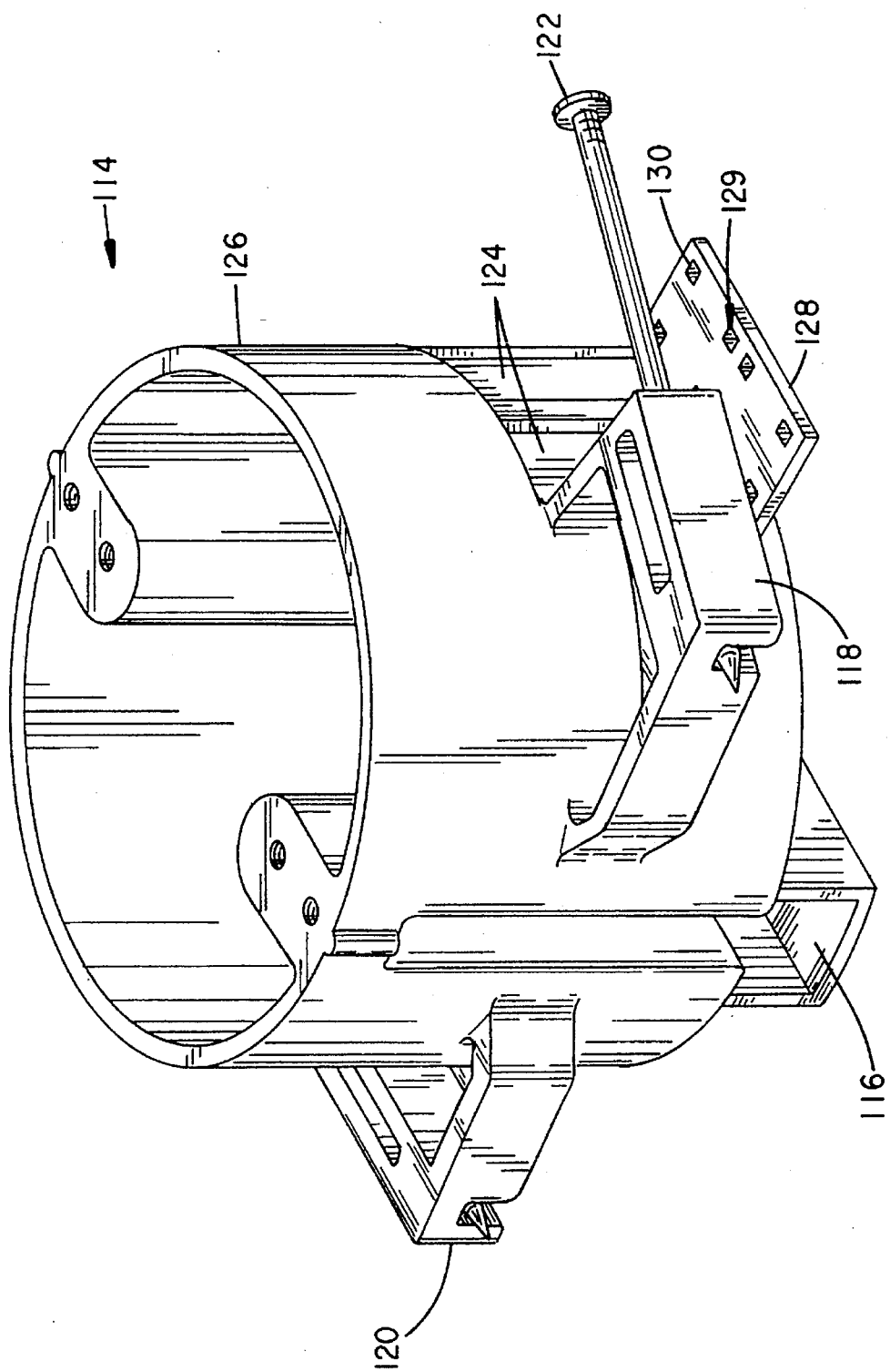
FIG. 7 is a perspective drawing of a nailable, round fixture box which is compatible with the retainer strap and can alternatively be mounted to the support bracket.

Turning attention to FIG. 7, another circular junction box 114 is shown which is compatible with the bracket 60 at a provided channel 116. The channel 116 completely encircles the bracket sections 62, 64. A junction box 114 including such a channel 116 is typically constructed from a rigid plastic material. The vertical height of the channel 116 is sized to permit movement along the bracket sections 62, 64, before the provided prongs 112 (not shown) are inserted.

Projecting from the peripheral sidewalls of the junction box 114 are a pair of nailing flanges 118, 120, which separately support nail fasteners 122. The fasteners 122 permit use of box 114 independent of the bracket 60.

Knockouts 124 are provided in a body 126 of the box 114 adjacent further flanges 128, only one of which is shown. Each flange 128 includes a number of paired sets 129 of serrated apertures 130 which appropriately support a number of conductors at provided straps 6.

Figure 8:
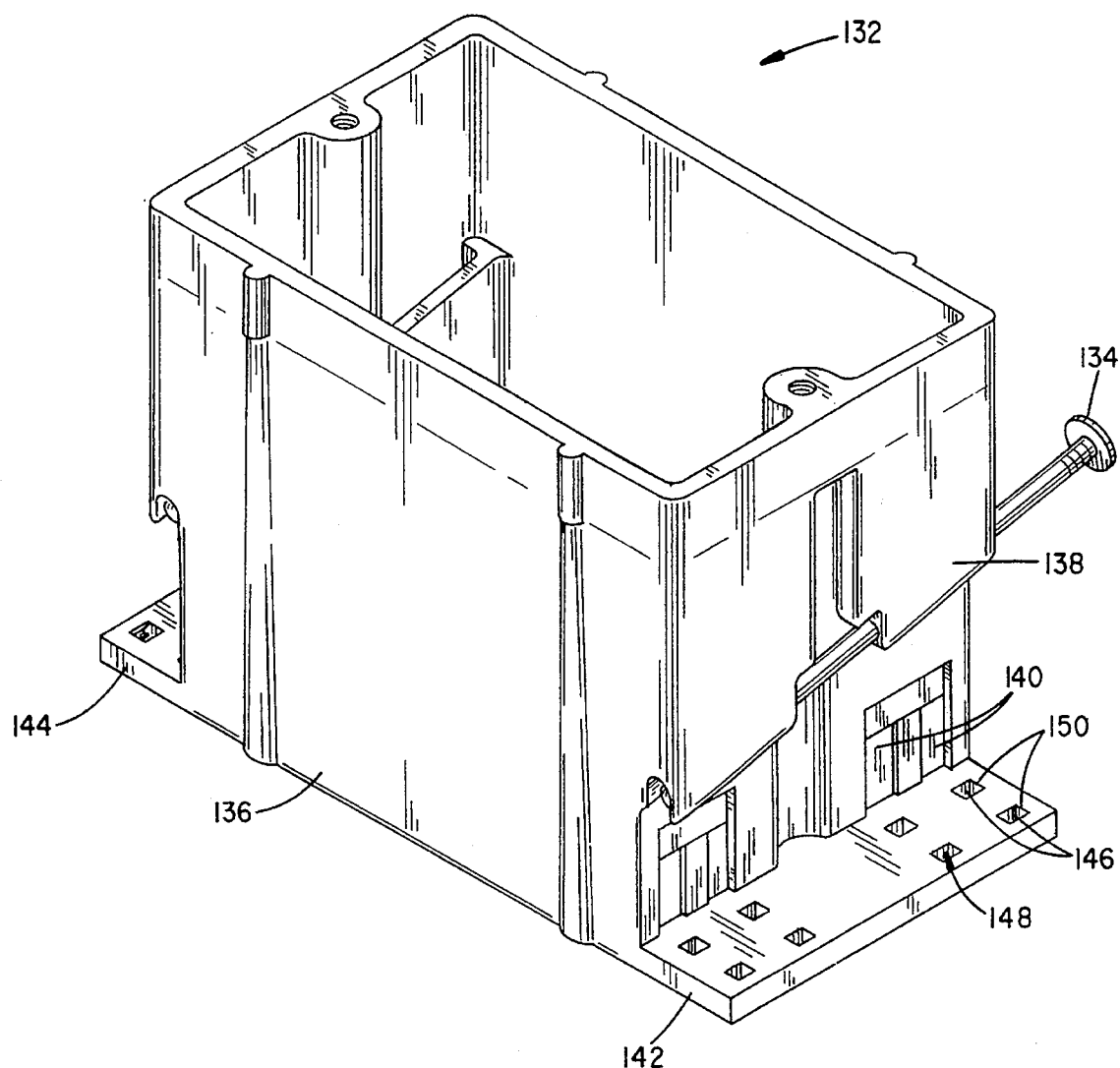
FIG. 8 is a perspective drawing of a nailable, rectangular junction box compatible with the retainer strap.

FIG. 8 depicts yet another junction box 132 such as is secured to a wood stud member to receive a duplex receptacle (not shown). Nail fasteners 134 are retained to a body 136 at sleeved retainers 138. Thin walled knockouts 140 are formed into the body 136 at flanged ends 142, 144. Paired sets 146 of apertures 148 having serrated bore surfaces 150 are provided at each flange 142, 144. Upon securing a junction box to a framing member and routing appropriate conductors 20 through the knockouts 140, the conductors 20 are retained to the flanges 142, 146 with the straps 6.

Figure 9:
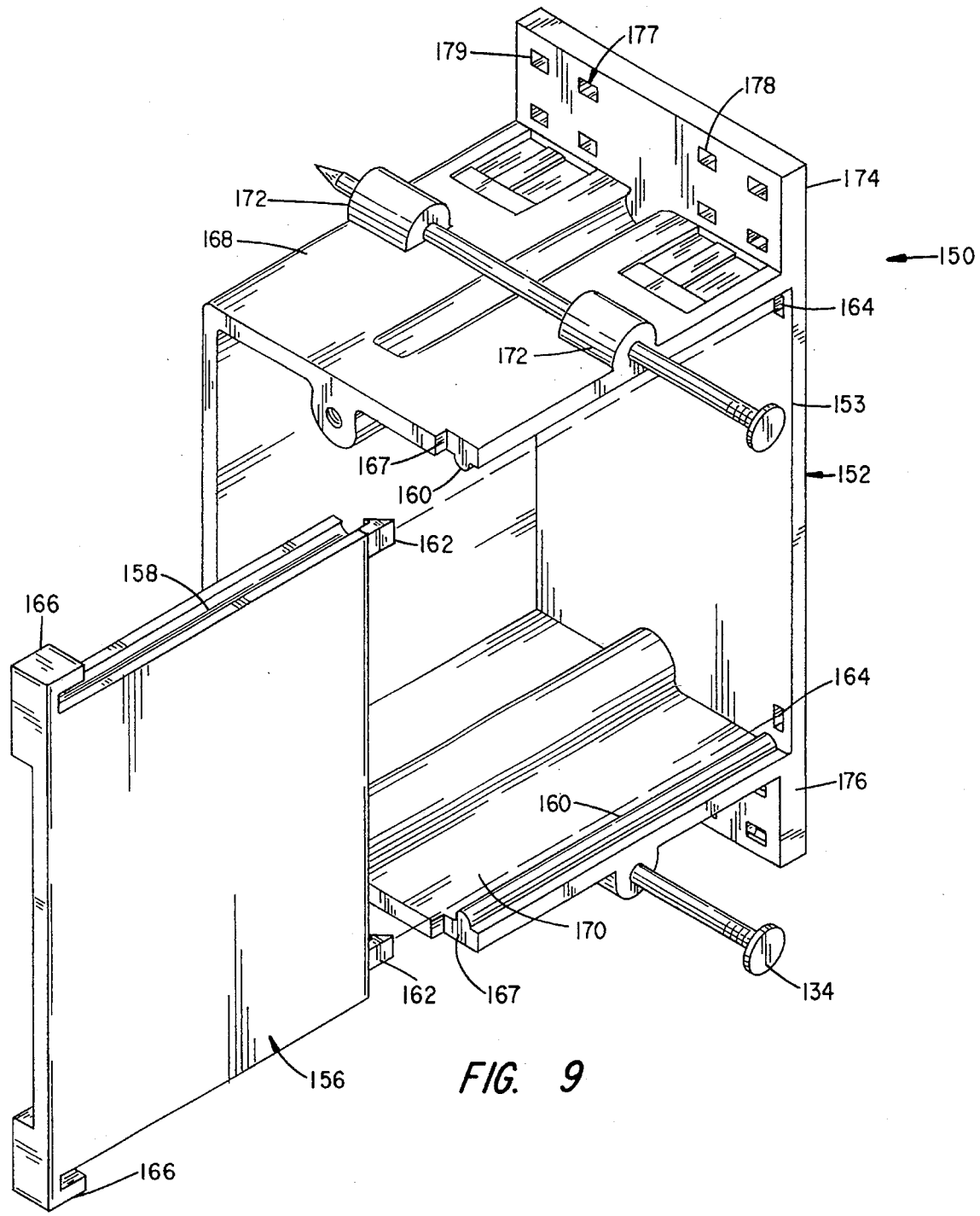
FIG. 9 is a perspective drawing shown in exploded assembly of an open ended box section and detachable end wall of a modular, multi-gang junction box which is compatible with the retainer strap.
Figure 10:
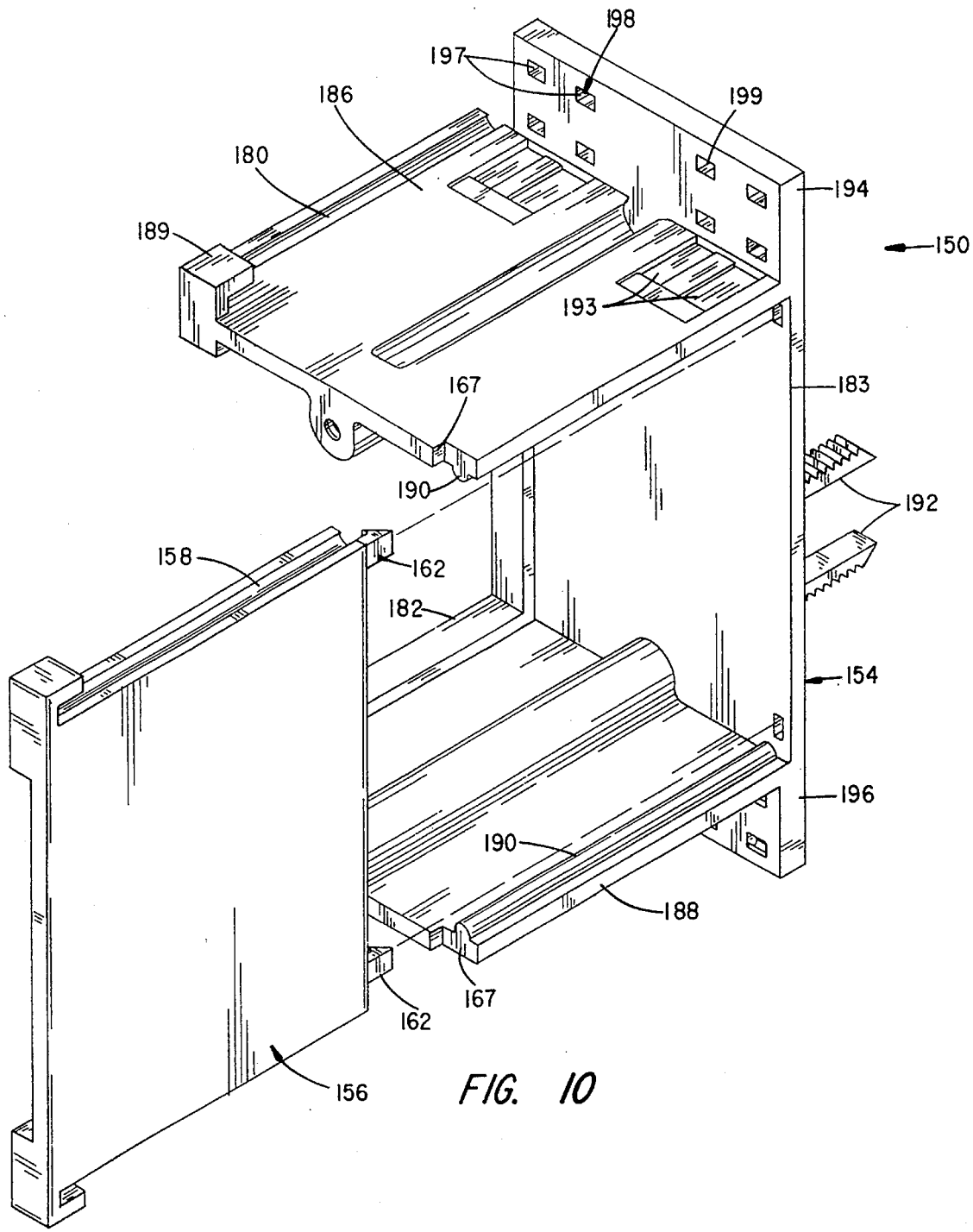
FIG. 10 is a perspective drawing of a center box section and detachable wall of a multi-gang junction box compatible with the end box section of FIG. 9 and retainer strap.

FIGS. 9 and 10 depict components of a multi-ganged, modularly arranged junction box assembly 150. The assembly 150 includes an end box 152, reference FIG. 9, and a center box 154, reference FIG. 10. A removeable sidewall 156 mounts to one side of either the open ends of the boxes 152, 154. The boxes 152, 154 find particular application for situations requiring a multi-gang box or a box which might later require replacement with a large box, such as with the addition of new lighting or equipment. The junction boxes 152, 154 and wall 156 can particularly be sized to accommodate one or any reasonable number of adjacent switches or duplex receptacles. That is, one or more junction boxes 154 can be combined with the end box 152 and a sidewall 156 to obtain an appropriate construction.

With attention to FIG. 9, a single gang or end box 152 is shown which has an open edge or end 153 and to which a sidewall 156 attaches. The sidewall 156 includes a pair of channels 158 which mate to projections 160 at the open edge 153. A pair of flanged projections 162 extend from an edge of the sidewall 156 and mate with apertures 164 in the box 152. Upon fitting the sidewall 156 to the box 152 and fully inserting the prongs 162 into the slots 164, the prongs 162 latch the sidewall 156 to the box 152. The sidewall 156 is further secured by a pair of end tabs 166, which overlap notches 167 at top and bottom walls 168, 170 of the box 152. The walls 168, 170 also include a pair of nail fasteners 134 at bored supports 172.

A pair of flanged ends 174, 176 project from the box 150 and include paired sets 177 of apertures 178 having serrated bores 179. The prongs 32 of the strap 6 mate to the apertures 178.

With attention to FIG. 10, one or more center boxes 154 can be sequentially mounted together, starting at the open edge 153 of an end box 152. Each center box has a pair of open peripheral edges 182, 183. The last box 154 within a series terminates at a sidewall 156.

Such multi-gang organizations are obtained by appropriately aligning a channel 180 (only one of which is shown) at the open edge 182 of the box 154. The channels 180 extend along the peripheral edges of each of a top and bottom wall 186, 188. The protrusions 160 of an adjacent end box 152 or protrusions 190 of an adjacent center box 152 align to the channels 180 to attach the box 152 or 154 to the series. Flanged tabs 189 latch to the edges 153, 183 to maintain a secure alignment of the boxes 152, 154 with respect to each other.

A further center box 154 can, in turn, be attached to protrusions 190 of the end-most open edge 183. Alternatively, a wall 156 can be secured to the edge 183 of the end-most box 154 in the previously described fashion to obtain an appropriately configured multi-gang box. A corresponding number of wiring devices can be secured to the boxes.

As desired, the box sections 152, 154 can also be retained to a bracket 60 upon appropriately affixing a pair of serrated prongs 192 to ones of the aperture sets 84. Although, prongs 192 are only shown at the box section 154, they may be included with the box section 152.

Conductors 20 are appropriately retained to the box 154 in association to knockouts 193 at end flanges 194, 196. The flanges 194, 196 include paired sets 198 of apertures 197 having serrated bores 199. The prongs 32 of the straps 6 mate to the apertures 197.

Figure 11:
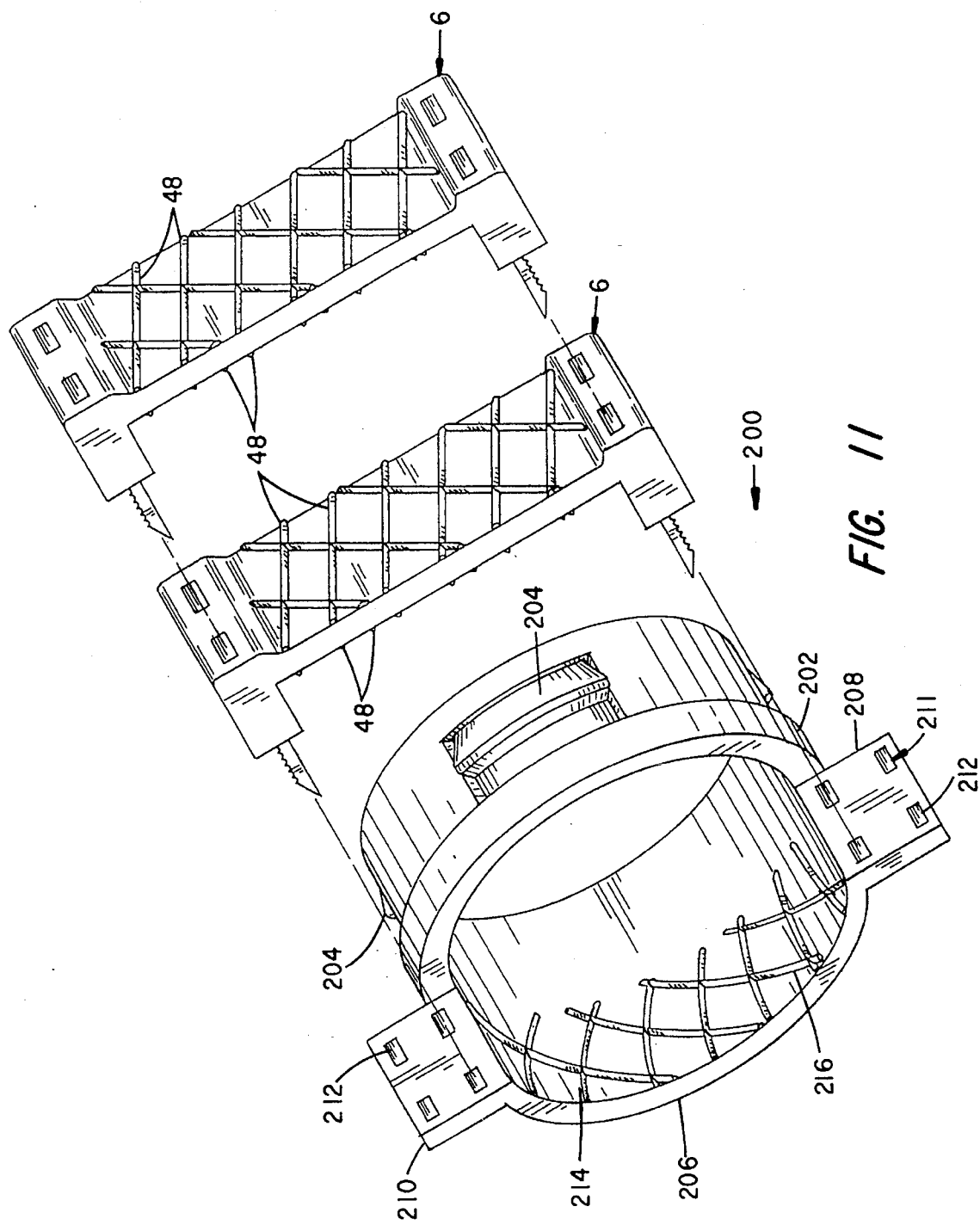
FIG. 11 is a perspective drawing of a bulk-head bushing for termination cabinets and junction boxes which is compatible with the retainer strap.

FIG. 11 discloses a bulkhead bushing 200 which is compatible with a retainer strap 6. A body 202 includes a number of resilient flanged fingers 204 which radially project and mount in conventional fashion to a circular aperture of a junction box or termination cabinet. That is, the fingers resiliently expand upon being passed through the aperture.

A semi-circular band 206 extends from an opposite end of the body 202. End flanges 208, 210 include paired sets 211 of serrated apertures 212. An interior surface 214 of the band 206 includes a number of criss-crossed protrusions 216 which grip the conductor cover 35 in a fashion similar to the protrusions 48 at the mating strap 6. Upon securing the bushing 200 to a junction box or bulkhead, one or more straps 6 can be mounted to the flanges 208, 210 to retain one or more conductors 20.

Figure 12:
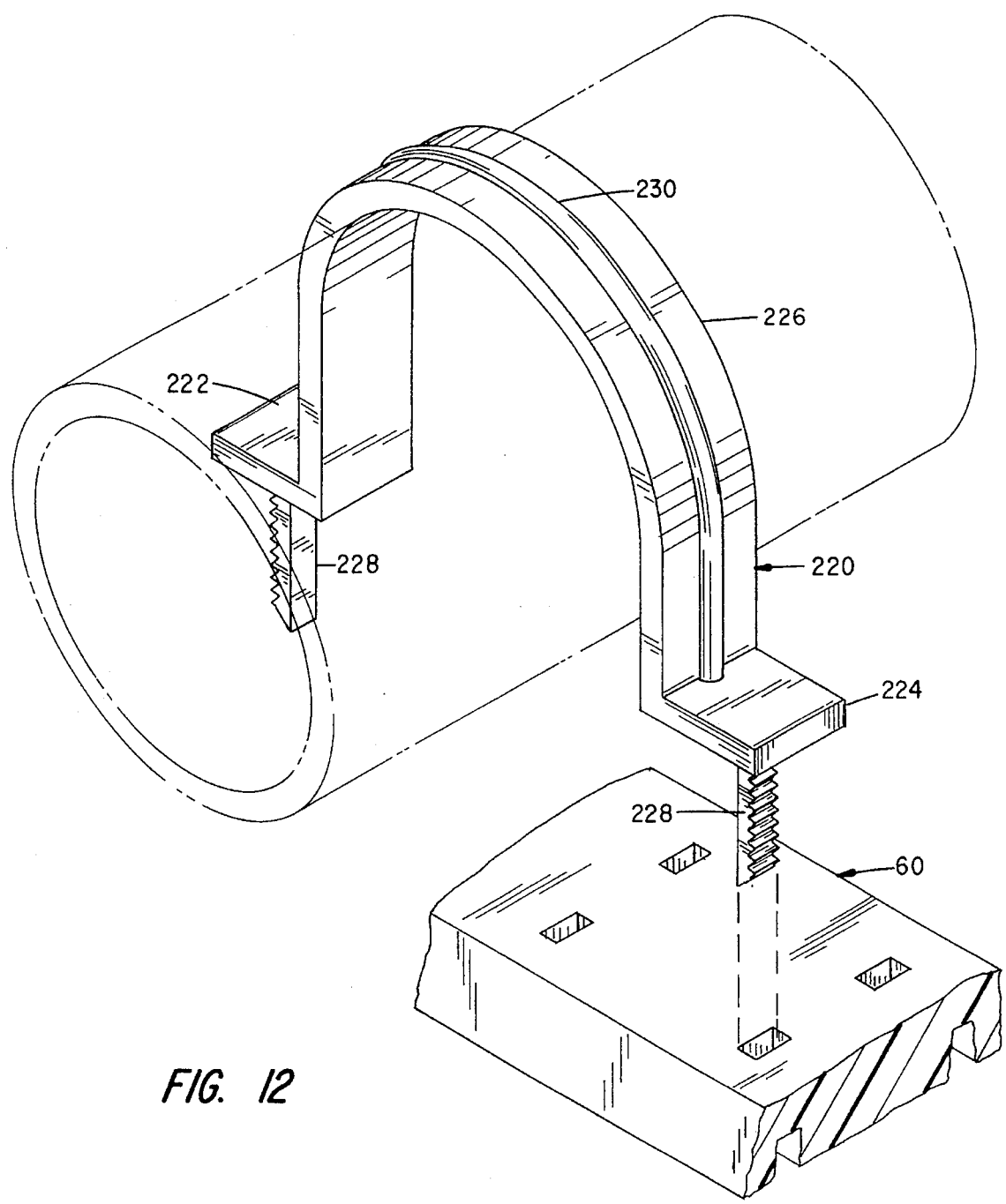
FIG. 12 is a perspective drawing shown in exploded assembly of a conduit or pipe strap which can be mounted to the support bracket or appropriately spaced base straps.

Turning attention lastly to FIG. 12, a conduit strap 220 is shown. The strap can be secured to a bracket 60 or to a lesser extent to a pair of base straps 4, which are appropriately fastened to adjacent framing members. Flanged ends 222, 224 extend from a semi-circular strap body 226 and contain serrated prongs 228. The prongs 228 mount to the apertures 86 or 28 at the bracket 60 or strap bases 4 and bind a conduit 230 (shown in phantom line) beneath the strap body 226 to the framing member. The dimensions of the strap body 226 can be adjusted to accommodate conduits of various sizes. A rib 230 is provided at the strap 226 to provide strength.

While the invention has been described with respect to various presently preferred constructions and considered modifications and improvements, still other constructions may suggested to those skilled in the art. The invention should accordingly be interpreted within the spirit and scope of the appended claims.

What is claimed is:

1. A fastener for an electrical conductor comprising;
   a) a base strap having first and second standoffs, each having a bore with a serrated surface, a first bridge extending between said first and second standoffs to define a first conductor support channel beneath said first bridge, and means for securing said base strap to a mounting surface;
   b) a retainer strap having third and fourth standoffs and a second bridge extending between said third and fourth standoffs to define a second conductor support channel beneath said second bridge, wherein third and fourth bores at said third and fourth standoffs each include a serrated surface, and wherein first and second prongs having serrated surfaces extend from said third and fourth standoffs, whereby a first conductor is contained in said first channel and a second conductor is vertically stacked at said second channel upon mounting said base strap to said mounting surface and mounting said first and second prongs to the bores of said first and second standoffs; and
   c) tab means at said second channel for biasing said first and second prongs into engagement with the serrated surfaces of one bores of said first and second standoffs.

2. Apparatus as set forth in claim 1 wherein said base strap includes fastener means for attaching said base to one or more framing members.

3. Apparatus as set forth in claim 1 wherein a plurality of protrusions project from said first and second bridges to restrain said conductors mounted within said first and second channels.

4. Apparatus as set forth in claim 1 wherein said first and second standoffs respectively include first and second nails, wherein portions of said first and second standoffs extend above said first bridge to define a portion of said second channel.

5. Apparatus as set forth in claim 1 wherein said tab means comprises inclined surfaces which project into second channel in the region of the juncture between said third and fourth standoffs and said second bridge.

6. Apparatus as set forth in claim 1 wherein an aperture communicates through the bore of each of said first and second standoffs and whereby the first and second prongs can be released from said base strap.

7. Apparatus as set forth in claim 1 including first and second latches at said first and second standoffs which mate to said first and second prongs.

8. Apparatus as set forth in claim 1 wherein said second bridge arcuately extends between said third and fourth standoffs.

9. A fastener for an electrical conductor comprising;
   a) a base strap having first and second standoffs and a first bridge extending between said first and second standoffs from a point depressed from the top of said first and second standoffs to define a first conductor support channel beneath said first bridge, wherein first and second nails respectively extend from said first and second standoffs, wherein a bore with a serrated surface parallel each of said first and second standoffs extends to said first and second nails, and wherein an aperture communicates with the bore of each of said first and second standoffs;
   b) a retainer strap having third and fourth standoffs and a second bridge extending between said third and fourth standoffs from a point depressed from the top of said third and fourth standoffs to define a second conductor support channel beneath said second bridge, wherein third and fourth bores, each having a serrated surface, extend coaxial to the bores of said first and second standoffs, wherein an aperture communicates through each of said third and fourth standoffs to each of said third and fourth bores, and wherein first and second prongs having serrated surfaces extend from said third and fourth standoffs, whereby a first conductor is contained in said first channel and a second conductor is vertically stacked at said second channel upon mounting said base strap to a mounting surface and said first and second prongs to the bores of said first and second standoffs.

10. Apparatus as set forth in claim 9 including inclined surfaces which project into said second channel in the region of the juncture between said third and fourth standoffs and said second bridge to bias said first and second prongs into engagement with the serrated surfaces of the bores of said first and second standoffs.

11. An electrical wiring device comprising:
    a) first and second members which telescope from one another and which members include a plurality of bores having serrated surfaces and means for retaining said first and second members between a pair of displaced framing members;
    b) a junction box having a body which includes i) a plurality of apertures which receive electrical conductors; ii) a flanged surface adjacent at least one of said apertures containing a plurality of bores each having a serrated surface; and iii) a channel which mounts about said first and second members; and
    c) a retainer strap having first and second standoffs and a bridge extending between said first and second standoffs to define a conductor support channel, wherein each of said first and second standoffs includes a bore having a serrated surface, and wherein first and second prongs having serrated surfaces extend from said first and second standoffs, whereby the junction box is retained to the first and second members by said channel and a conductor is retained to said flanged surface upon mounting said first and second prongs to the bores of said flanged surface.

12. An electrical wiring device comprising:
a) first and second members which telescope from one another and which members include a plurality of bores having serrated surfaces and means for retaining said first and second members between a pair of displaced framing members;
b) a junction box having a body which includes i) a plurality of apertures which receive electrical conductors; ii) a flanged surface adjacent at least one of said apertures containing a plurality of bores each having a serrated surface; and iii) a plurality of serrated prongs which project from said body; and
c) a retainer strap having first and second standoffs and a bridge extending between said first and second standoffs to define a conductor support channel, wherein each of said first and second standoffs includes a bore having a serrated surface, and wherein first and second prongs having serrated surfaces extend from said first and second standoffs, whereby the junction box is retained to the first and second members and a conductor is retained to said flanged surface upon mounting the serrated prongs to the bores of said first and second members and said first and second prongs to the flanged surface.

13. Apparatus as set forth in claim 12 wherein said junction box includes an open side and further includes a removeable sidewall and means for attaching said removable sidewall to said open side.

14. Apparatus as set forth in claim 12, wherein said junction box includes an open side, and further including a gangeable box section having first and second open sides, means for securing one of said first and second open sides of said gangeable box section to the open side of said junction box and means for securing a removeable sidewall to the other of said first and second open sides of said gangeable box section.

15. A gangeable junction box comprising;
a) a first box section having a body which includes i) a plurality of rigid side and end walls which orthogonally project from a bottom wall and define an open end and a first open side, wherein rails project from peripheral edges of said first open side; ii) a plurality of apertures which receive electrical conductors; and iii) a flanged surface adjacent at least one of said apertures containing a plurality of bores each having a serrated surface;
b) a detachable sidewall having first and second channels which slide mount to said rails; and
c) retainer means at said detachable sidewall for securing said detachable sidewall to the end walls of said junction box.

16. Apparatus as set forth in claim 15 wherein said retainer means comprises a plurality of flanged prongs which extend from said detachable sidewall and mount to slots at said bottom wall of said first box section.

17. Apparatus as set forth in claim 15 including a second box section having a body which includes i) a plurality of rigid end walls which orthogonally project from a bottom wall to define an open end and second and third open sides, wherein channels extend along peripheral edges of said end walls at said second open side; ii) a plurality of apertures which receive electrical conductors; iii) a flanged surface adjacent at least one of said apertures containing a plurality of bores each having a serrated surface; and iv) wherein the rails of said first open side slide mount to the channels of said second open side and said detachable sidewall slide mounts to the third open side.

18. Apparatus as set forth in claim 17 wherein said retainer means comprises a plurality of flanged prongs which mount to slots at the bottom wall of said second box section.

* * * * *